US012649208B2

(12) United States Patent
Kubota

(10) Patent No.: US 12,649,208 B2
(45) Date of Patent: Jun. 9, 2026

(54) MACHINE TOOL

(71) Applicant: DMG MORI CO., LTD., Nara (JP)

(72) Inventor: Junichi Kubota, Nara (JP)

(73) Assignee: DMG MORI CO., LTD., Nara (JP)

( * ) Notice: Subject to any disclaimer, the term of this patent is extended or adjusted under 35 U.S.C. 154(b) by 299 days.

(21) Appl. No.: 18/227,934

(22) Filed: Jul. 30, 2023

(65) Prior Publication Data

US 2023/0405751 A1    Dec. 21, 2023

Related U.S. Application Data

(63) Continuation of application No. PCT/JP2022/001772, filed on Jan. 19, 2022.

(30) Foreign Application Priority Data

Feb. 1, 2021    (JP) ................................. 2021-014081

(51) Int. Cl.
B23Q 15/12 (2006.01)
G05B 19/4065 (2006.01)
(52) U.S. Cl.
CPC ......... B23Q 15/12 (2013.01); G05B 19/4065 (2013.01)
(58) Field of Classification Search
None
See application file for complete search history.

(56) References Cited

U.S. PATENT DOCUMENTS

| | | | |
|---|---|---|---|
| 2002/0003415 A1 | 1/2002 | Nakai et al. | |
| 2005/0264793 A1 | 12/2005 | Roders et al. | |
| 2011/0265835 A1* | 11/2011 | Sato ................... | B23Q 17/2457 |
| | | | 134/56 R |
| 2016/0334777 A1 | 11/2016 | Sato | |

FOREIGN PATENT DOCUMENTS

| | | |
|---|---|---|
| CN | 111906347 A | 11/2020 |
| EP | 1591196 A1 | 11/2005 |
| JP | H9-38814 A | 2/1997 |
| JP | 2002-018680 A | 1/2002 |
| JP | 2016-218550 A | 12/2016 |
| WO | 2015/104945 A1 | 7/2015 |

* cited by examiner

*Primary Examiner* — Ryan A Jarrett

(74) *Attorney, Agent, or Firm* — IP Business Solutions, LLC

(57) ABSTRACT

A machine tool includes a camera fixed to a predetermined imaging area and for imaging a tool inserted into the imaging area, a tool holding portion to which a tool is attachable, and a machining control portion for controlling the tool holding portion in accordance with a machining program and machining a workpiece with the tool. The machining control portion moves the tool toward the imaging area after rotating the tool to image the tool.

8 Claims, 14 Drawing Sheets

290

190

MACHINE TOOL

CROSS-REFERENCE TO RELATED APPLICATIONS

This application is a continuation application of International Application No. PCT/JP2022/001772 filed on Jan. 19, 2022, which claims priority to and the benefit of Japanese Patent Application No. 2021-014081 filed on Feb. 1, 2021. The contents of these applications are incorporated herein by reference in their entirety.

BACKGROUND OF INVENTION

1. Field

The present invention relates to a technology for checking the state of tools in machine tools.

2. Description of Related Art

Machine tools include devices for cutting a workpiece into a desired shape, and devices for depositing metal powder or the like to make a workpiece. Examples of machine tools for cutting include a turning center that machines a workpiece by applying a cutting tool to the workpiece that is being turned, a machining center that machines a workpiece by applying a turning tool to the workpiece, and a combined machine including these functions in combination.

Tools are fixed to a tool holding portion such as a spindle or a turret. A machine tool machines a workpiece while changing the tools and moving the tool holding portion in accordance with a machining program provided in advance (see Patent Literature 1).

RELATED ART LIST

Patent Literature 1: JP 2016-218550 A

There are cases in which the state of a tool attached to the tool holding portion and being used is to be checked. For example, when a tool is brought to hard contact with equipment such as a tailstock, it is necessary to check whether the tool is damaged.

There is conceived a method in which an imaging area is set in a machining chamber, a tool is inserted into the imaging area to image the tool with a camera, and the state of the tool is checked on the basis of a captured image.

In this case, it is undesirable that a tool being used is inserted as it is in the imaging area. Since swarf of a workpiece or a coolant adheres on the tool immediately after used, adhering substances on the tool may spoil the imaging area.

SUMMARY

A machine tool according to an embodiment of the present invention includes: a camera fixed to be capable of imaging a predetermined imaging area and for imaging a tool located in the imaging area; a tool holding portion to which a tool is attachable; and a machining control portion for controlling the tool holding portion in accordance with a machining program and machining a workpiece with the tool.

The machining control portion moves the tool toward the imaging area to image the tool after rotating the tool.

According to the present invention, it becomes easy to check the state of tools properly.

DETAILED DESCRIPTION

Figure 1:
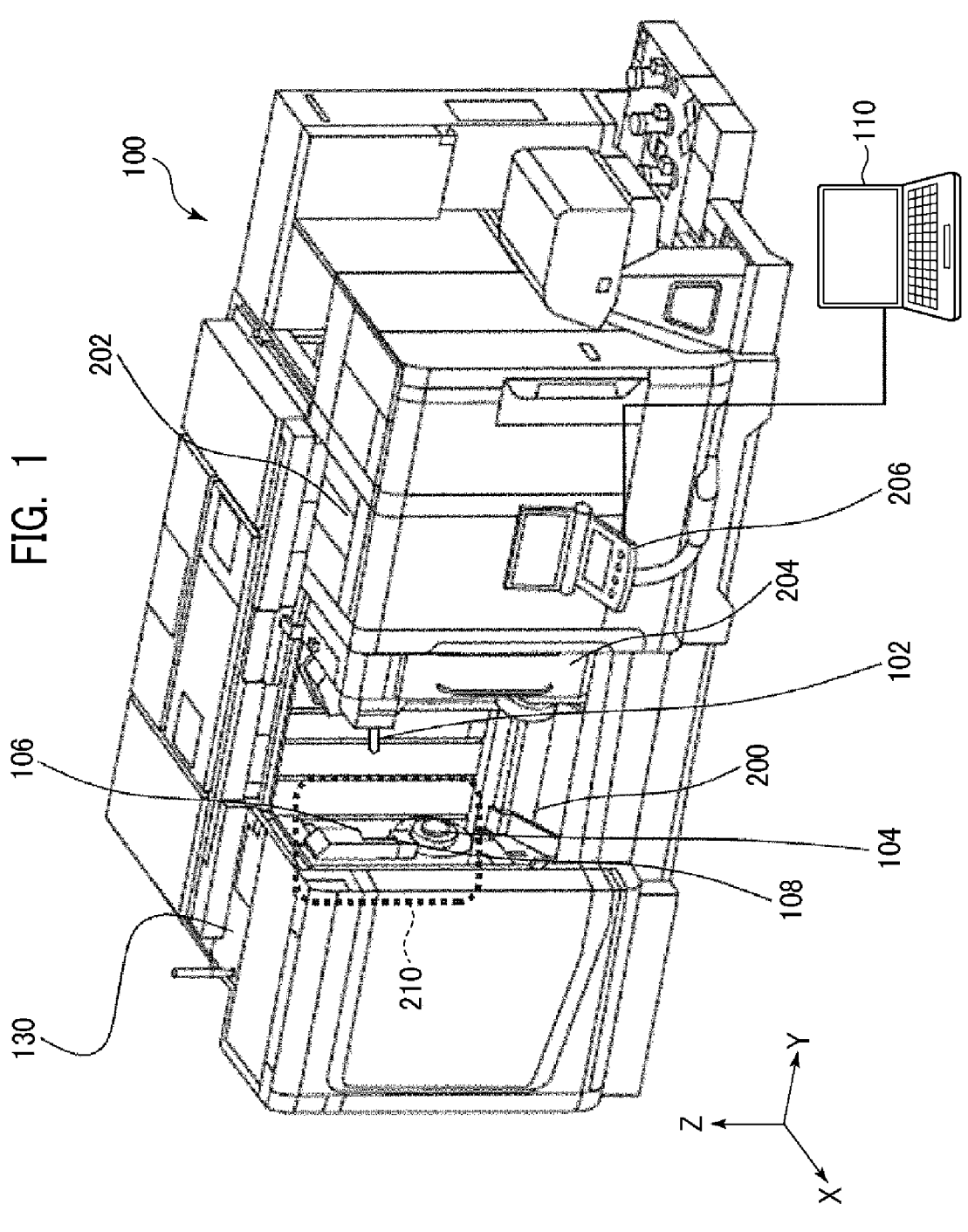
FIG. 1 is an external view of a machine tool.

FIG. 1 is an external view of a machine tool 100.

The machine tool 100 in the present embodiment is a combined machine that machines a workpiece placed in a machining area 200. The workpiece is fixed to a holding portion 104 and is cut by tools 102 attached to a spindle which is another holding portion. The holding portion 104 that holds the workpiece is rotationally driven by a driving mechanism.

An imaging area (described later) is set in a tool recognition area 210. When a tool 102 is inserted into the tool recognition area 210, an illumination device 108 located therebelow illuminates the tool 102 and a camera 106 located thereabove images the tool 102. A tool test described later is performed on the basis of images captured at this time. A configuration of the tool recognition area 210 will be described later with reference to the following FIGS. 2, 3, and 4.

The machine tool 100 includes a cover 202 that blocks the exterior. The cover 202 includes a door 204. An operator opens the door 204 to mount a workpiece on the machining area 200 and to take out the workpiece from the machining area 200. A console 206 receives various operations to the machine tool 100 from the operator.

The console 206 is connected to an image processing device 110. The operator can remotely monitor a working status of the machine tool 100 using the image processing device 110. In the present embodiment, the body of the machine tool 100 and the image processing device 110 are connected with a cable. The image processing device 110 may be formed as a device inside the machine tool 100, for example, an internal device of the console 206.

A tool storage portion 130 has a plurality of tools 102 stored therein. A tool 102 is acquired from among the tools 102 stored in the tool storage portion 130 by a tool changing portion (described later) and is attached to the spindle. As illustrated in FIG. 1, an X axis and a Y axis are set in the horizontal direction and a Z axis is set in the vertical direction. The Y-axis direction corresponds to the axial direction of the spindle and a workpiece.

Figure 2:
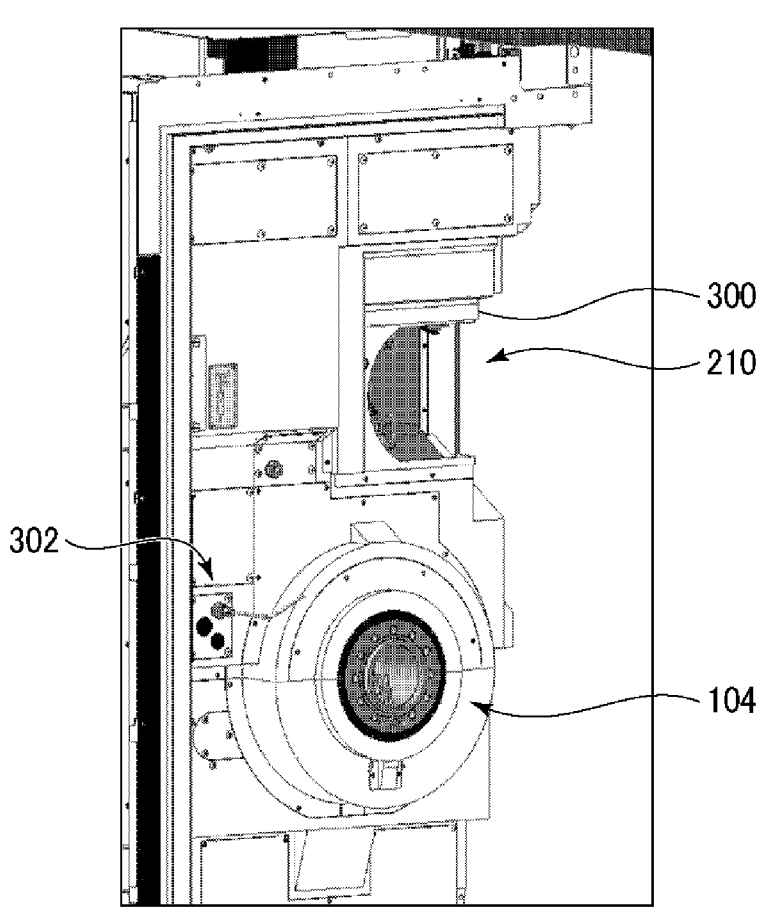
FIG. 2 is a peripheral perspective view of a tool recognition area.

FIG. 2 is a peripheral perspective view of the tool recognition area 210.

The tool recognition area 210 is formed in a part of the machining area 200. Specifically, the tool recognition area 210 (a space) is formed above the holding portion 104 to which a workpiece is fixed. The tool recognition area 210 includes the camera 106 and the illumination device 108 (which will be described later with reference to FIGS. 3 and 4).

An external cover 300 is a movable partition plate (shutter) that closes the tool recognition area 210. At the time of machining a workpiece, the tool recognition area 210 is closed by the external cover 300. A coolant that is a cooling liquid for removing frictional heat produced between the workpiece and a tool 102 is injected in the machining area 200 during machining. Swarf of the workpiece also scatters in the machining area 200. Therefore, the tool recognition area 210 is closed by the external cover 300 to prevent the coolant and the like from entering the tool recognition area 210.

When a tool test is instructed by a measurement command or the like, the machine tool 100 stops machining of the workpiece. At this time, the machine tool 100 also stops injection of the coolant. Next, the spindle moves the tool 102 at a predetermined position (hereinafter referred to as a "standby position") short of the tool recognition area 210 and rapidly rotates the tool 102 at the standby position. With the rapid rotation of the tool 102, the coolant and the swarf (hereinafter collectively referred to as "adhering substances") adhering on the tool 102 are shaken off. Hereinafter, the rapid rotation of the tool 102 to remove adhering substances at the standby position is referred to as "cleaning rotation".

The speed and the number of times of the cleaning rotation can be freely set. The operator or a designer of the machine tool 100 may determine appropriate values for the speed and the number of times sufficient to shake off the adhering substances on the tool 102 by experiments. The rotation speed of the cleaning rotation is desirably higher than the rotation speed of the tool 102 at the time of a tool test which will be described later. The rotation speed of the cleaning rotation is at least one rotation or more per minute (equal to or more than 1 rpm) and is desirably in a range of 500 rpm to 2000 rpm.

The imaging time for one rotation of the tool 102 at the time of a tool test is longer than one second. Therefore, when images of one rotation of a tool are to be captured, the rotation speed of the tool 102 is set to less than 60 rpm. When the tool 102 is rotated for cleaning at a speed equal to or higher than a predetermined rotation speed, one example of the "predetermined rotation speed" is a rotation speed higher than the rotation speed of the tool 102 corresponding to the imaging time of one rotation of the tool 102. In this case, 60 rpm or a higher speed suffices as the rotation speed of the cleaning rotation. Even in a case in which images in the longitudinal direction of the tool 102 are captured without rotating the tool 102, a certain level of effect is obtained by rotating the tool 102 at least at 60 rpm of the rotation speed of the cleaning rotation and removing the coolant and the like adhering on the tool 102. In the present embodiment, the rotation speed of the cleaning rotation is assumed to be 1000 rpm.

After the cleaning rotation, the external cover 300 is opened and a tool is caused to enter the tool recognition area 210. The tool 102 inserted into the tool recognition area 210 is imaged with the camera 106 to check the tool shape. Inserting a tool 102 into the tool recognition area 210 and testing the shape of the tool 102 is referred to as a "tool test". Details of the tool test will be described later.

The machining area 200 leads to the tool storage portion 130 through the tool recognition area 210. Therefore, when a tool is to be changed, the spindle is inserted deeply into the tool recognition area 210. Since a tool passes the tool recognition area 210 not only at the time of a tool test but also at the time of a tool change, the cleaning rotation is performed similarly before the passage.

An air nozzle 302 is installed next to the holding portion 104. The air nozzle 302 injects air. The adhering substances on the tool 102 can be eliminated by moving the spindle near the air nozzle 302 and injecting air from the air nozzle 302. Hereinafter, injection of air to a tool 102 from the air nozzle 302 to remove adhering substances is referred to as "cleaning injection". While the cleaning rotation is mainly explained in the present embodiment, the cleaning injection is also noted with reference to FIG. 14.

Figure 3:
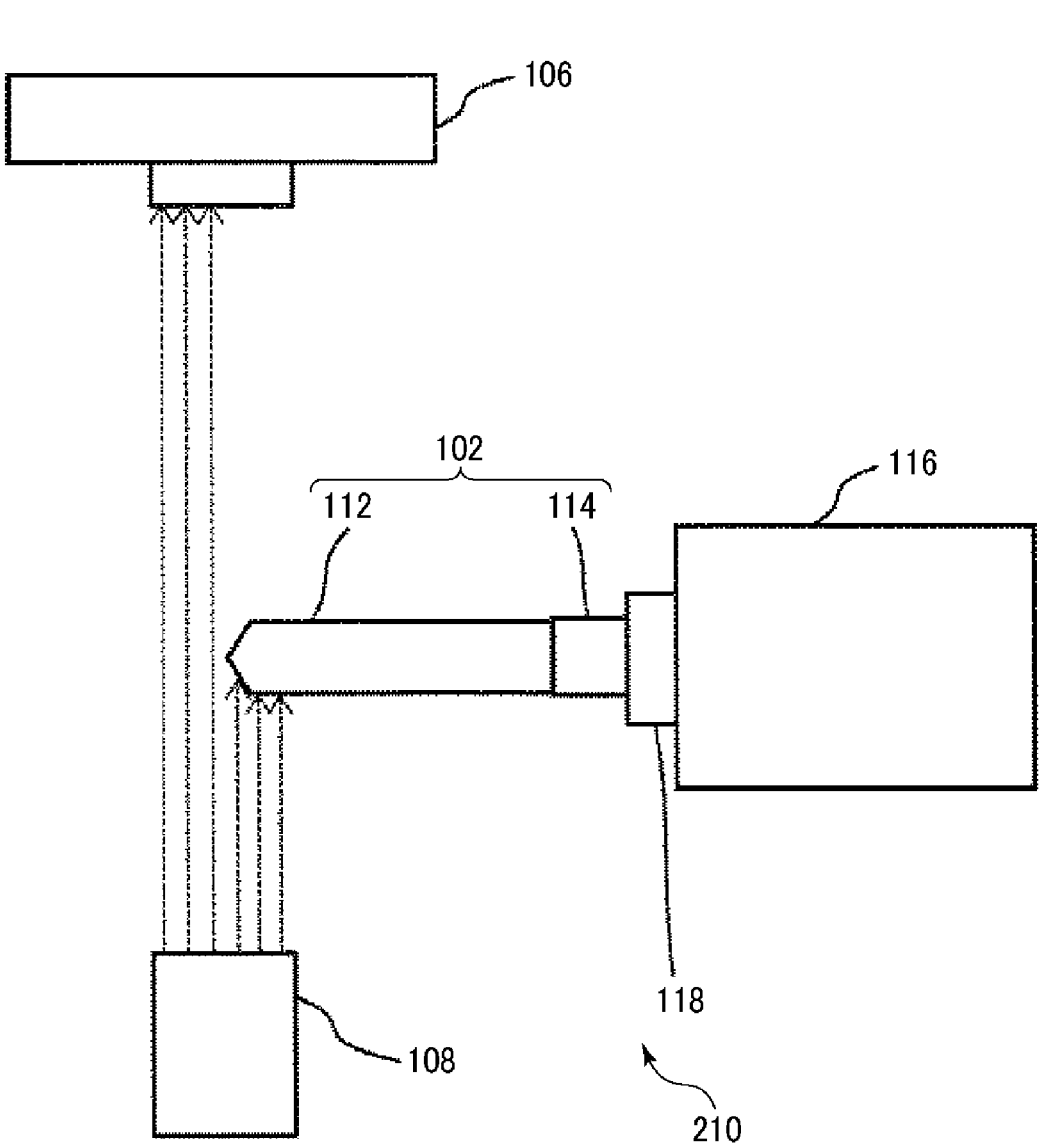
FIG. 3 is a schematic diagram illustrating a positional relation among a tool, a camera, and an illumination device in the tool recognition area.
Figure 3:
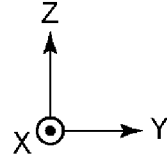

FIG. 3 is a schematic diagram illustrating a positional relation among a tool 102, the camera 106, and the illumination device 108 in the tool recognition area 210.

The tool 102 includes a blade portion 112 to be used for machining of a workpiece, and a shank portion 114 being a region to be fixed to a holder 118 of the spindle 116. The spindle 116 is configured to be rotatable and movable while holding the tool 102. The spindle 116 which is also a holding portion can also rotate a tool held thereby.

The camera 106 includes an image sensor (an image pickup device) such as a complementary metal oxide semiconductor (CMOS) or a charge-coupled device (CCD). The camera 106 images the tool 102 attached to the spindle 116 from above (in the Z-axis direction). The camera 106 is fixed in the tool recognition area 210. The spindle 116 rotates the tool 102 around the Y axis, so that the tool 102 can be imaged from a plurality of directions. The spindle 116 also moves the tool 102 in the horizontal direction (the X and Y directions), so that a plurality of portions of the tool 102 can be imaged.

The illumination device 108 is fixed at a lower location to face the camera 106. The illumination device 108 illuminates the tool 102 from below. Transmitted illumination of the illumination device 108 enables the camera 106 to obtain a high-contrast image in which the outline position of the tool 102 is easily viewable.

When a tool 102 is to be newly registered, a user sets a tool registration mode on the console 206 and attaches the new tool 102 to the spindle 116. Next, the user inputs a freely-selected tool ID. The spindle 116 moves and rotates the tool 102 and the fixed camera 106 automatically images the tool 102 from various positions and directions. The tool shape is recognized from many images captured by the camera 106 and the tool ID and the tool shape are registered so as to be associated with each other. By this control method, the tool shape can be automatically registered for each tool 102 so as to be associated with the tool ID. Hereinafter, the shape of the tool 102 recognized at the time of new registration is referred to as a "registered shape". The tool shape data is formed as two-dimensional data or three-dimensional data.

The spindle 116 causes a tool 102 to enter the tool recognition area 210 also when a tool test is to be performed on the tool 102 that is in use or after use. Similarly at the time of new registration, the spindle 116 moves and rotates the tool 102 and the camera 106 automatically images the tool 102 from various positions and directions. The tool shape is recognized from many images captured by the camera 106. Hereinafter, the shape of the tool 102 recognized at the time of a test is referred to as a "tested shape". The operator determines the abrasion level of the tool 102 and whether the tool 102 includes a fracture by comparing the registered shape (the initial state) with the tested shape.

The camera 106 in the present embodiment has a resolution of about one million pixels (1224×1024). The imaging range is about 300 millimeters×300 millimeters. In addition, the camera 106 is capable of capturing a maximum of 80 images per second.

Figure 4:
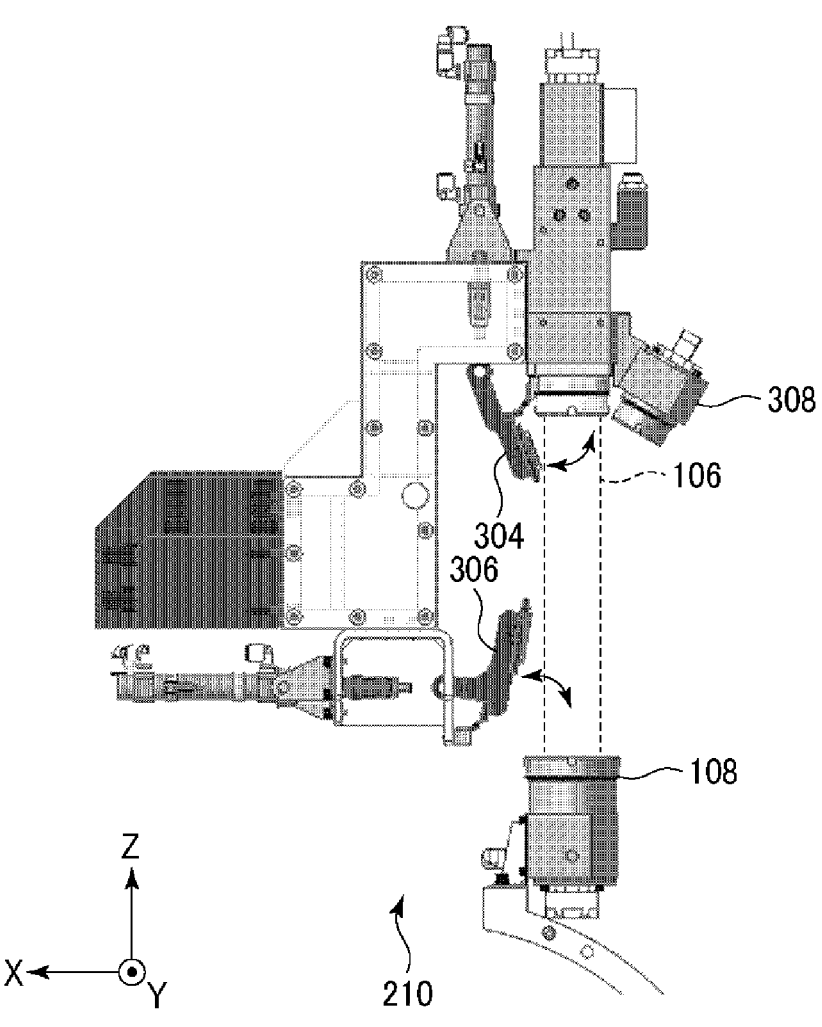
FIG. 4 is a side sectional view of mechanisms in the tool recognition area.

FIG. 4 is a side sectional view of mechanisms in the tool recognition area 210.

A tool 102 is inserted midway between the camera 106 and the illumination device 108. An illumination device 308 for illuminating the tool 102 from above is also installed on a side part of the camera 106. A first cover 304 for covering a light receiving face of the camera 106 is installed next to the camera 106. A second cover 306 for covering a light emitting face of the illumination device 108 is installed next to the illumination device 108. Hereinafter, the first cover 304 and the second cover 306 are collectively referred to as "internal covers".

The first cover 304 and the second cover 306 are rotationally driven on the Y axis as a rotation axis. Rotational driving of the first cover 304 and the second cover 306 enables opening and closing of the camera 106 and the illumination device 108, respectively.

Figure 5:
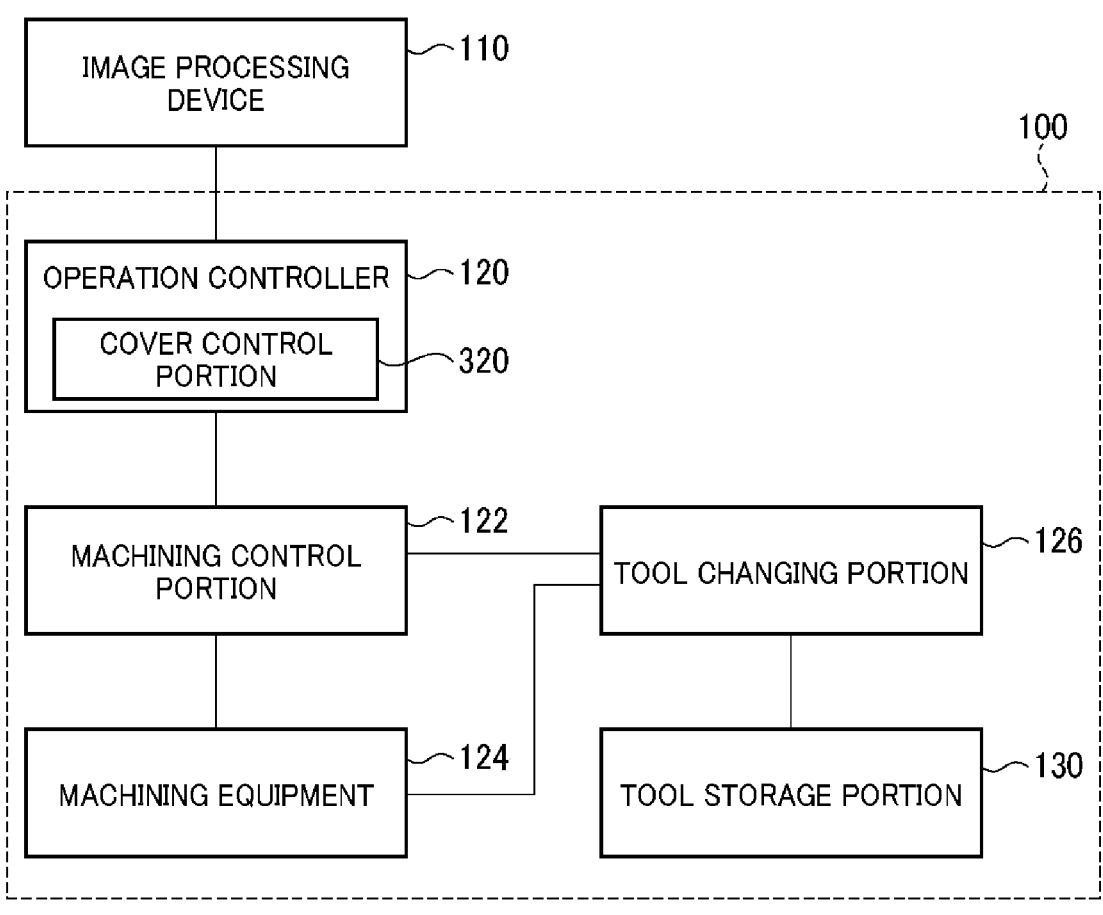
FIG. 5 is a hardware configuration diagram of the machine tool and an image processing device.

FIG. 5 is a hardware configuration diagram of the machine tool 100 and the image processing device 110.

The machine tool 100 includes an operation controller 120, a machining control portion 122, machining equipment 124, a tool changing portion 126, and the tool storage portion 130. The machining control portion 122 functioning as a numerical controller transmits control signals to the machining equipment 124 in accordance with a machining program. The machining equipment 124 drives the spindle 116 to machine a workpiece in accordance with instructions from the machining control portion 122.

The operation controller 120 includes the console 206 and controls the machining control portion 122. The tool storage portion 130 has tools stored therein. The tool changing portion 126 corresponds to a so-called ATC (Automatic Tool Changer). The tool changing portion 126 takes out a tool from the tool storage portion 130 and replaces the tool held on the spindle 116 with the taken-out tool in accordance with a replacement instruction from the machining control portion 122.

The operation controller 120 includes a cover control portion 320. The cover control portion 320 opens and closes the external cover 300 and the internal cover (the first cover 304 and the second cover 306).

The image processing device 110 mainly performs image processing such as recognition of tool shapes. As described above, the image processing device 110 may be configured as a part of the operation controller 120. The image processing device 110 may be a common laptop personal computer (PC) or tablet computer.

Figure 6:
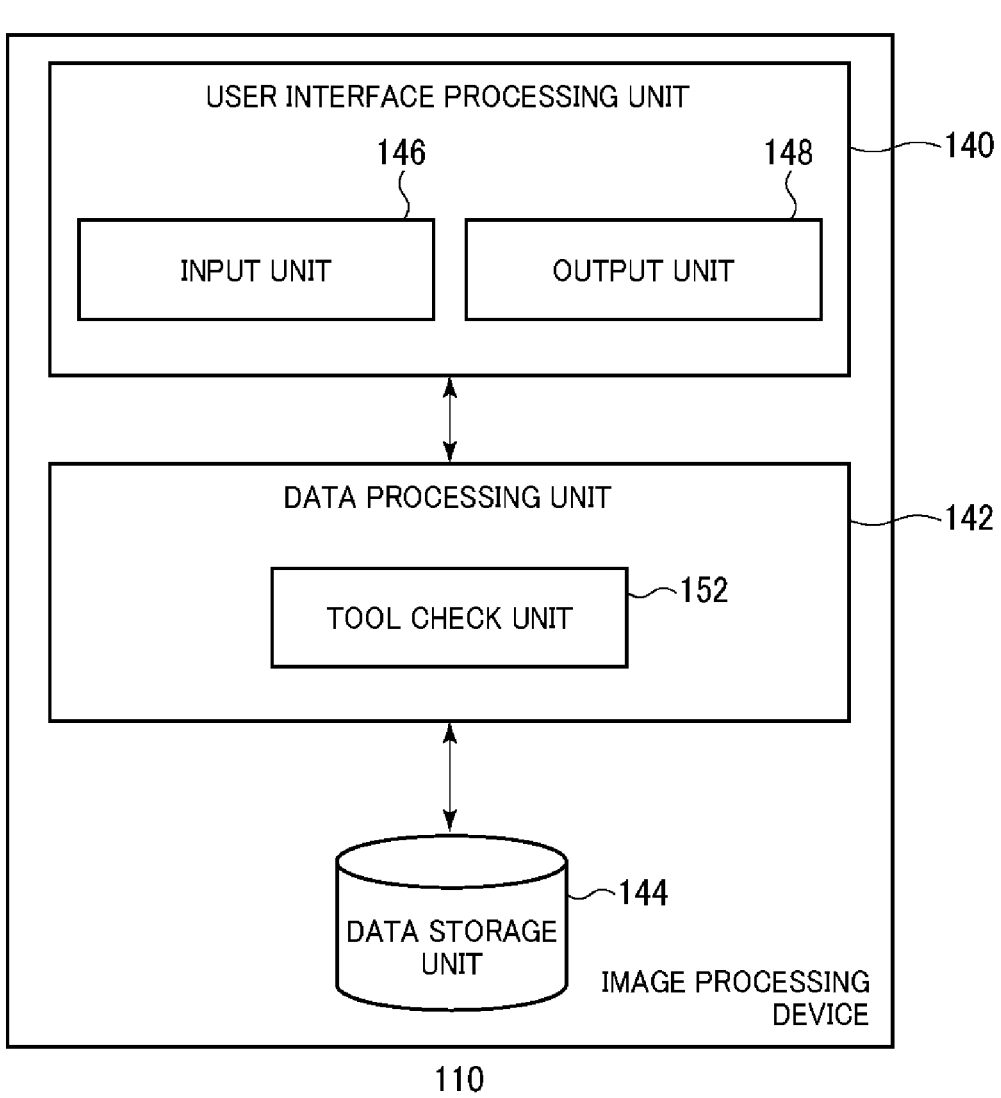
FIG. 6 is a functional block diagram of the image processing device.

FIG. 6 is a functional block diagram of the image processing device 110.

The components of the image processing device 110 are implemented by hardware including computing units such as central processing units (CPUs) and various co-processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks that are described below do not refer to configurations in units of hardware but to blocks in units of functions.

Note that the operation controller 120 and the machining control portion 122 may also be implemented by hardware including computing units such as processors, storage devices such as memories and storages, and wired or wireless communication lines that connect these units and devices, and software and programs that are stored in the storage devices and supply processing instructions to the computing units, which are executed on operation systems separate from the image processing device 110.

The image processing device 110 includes a user interface processing unit 140, a data processing unit 142, and a data storage unit 144.

The user interface processing unit 140 performs processes relating to user interfaces such as receiving operations made by a user, displaying images, and outputting audio. The data processing unit 142 performs various processes on the basis of data obtained by the user interface processing unit 140 and data stored in the data storage unit 144. The data processing unit 142 also functions as an interface of the user interface processing unit 140 and the data storage unit 144. The data storage unit 144 stores various programs and set data.

The user interface processing unit 140 includes an input unit 146 and an output unit 148.

The input unit 146 receives inputs made by the user via a touch panel or a hardware device such as a handle. The output unit 148 provides the user with various information by image display or audio output.

The data processing unit 142 includes a tool check unit 152. The tool check unit 152 performs tool tests. The tool check unit 152 generates data (tool shape data) indicating a three-dimensional shape of the tool 102 on the basis of captured images.

Figure 7:
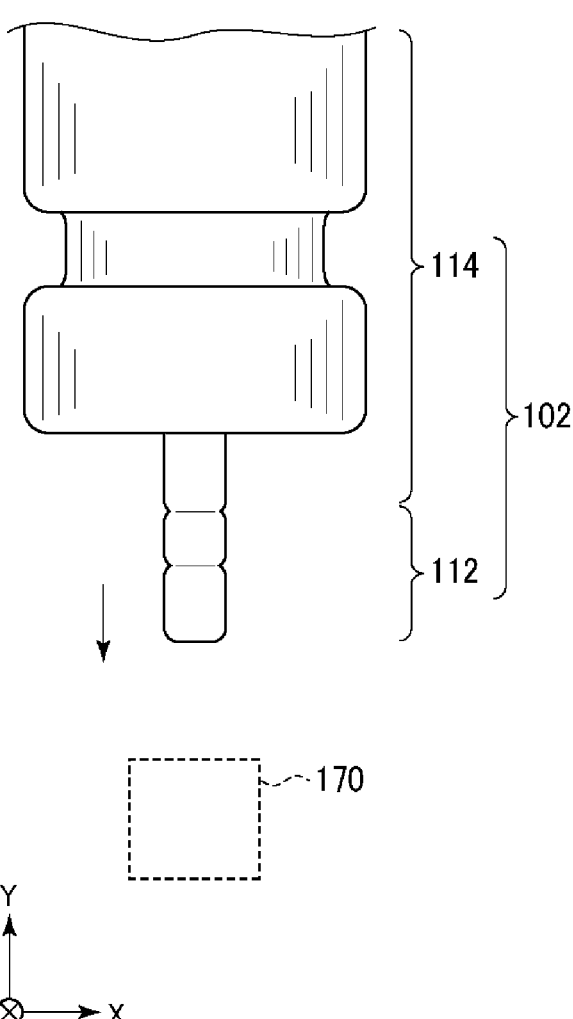
FIG. 7 is a schematic diagram illustrating a positional relation between a tool and an imaging area.

FIG. 7 is a schematic diagram illustrating a positional relation between a tool 102 and an imaging area 170.

The imaging area 170 is positioned immediately below a light receiving face of the camera 106. The camera 106 images an object in the range of the imaging area 170. The machining control portion 122 inserts the tool 102 into the imaging area 170 by moving the spindle 116. Since the imaging area 170 is smaller than the tool 102, an image of the whole tool 102 cannot be captured at one time.

If the lens of the camera 106 is enlarged to enlarge the imaging area 170, the cost of the camera 106 is increased. If a large camera 106 is installed in the tool recognition area 210, the space of the machining area 200 is unfavorably decreased. Therefore, the present embodiment adopts a method of imaging the tool 102 multiple times using a relatively small camera 106 and recognizing the shape of the whole tool 102 on the basis of a plurality of captured images.

Hereinafter, an image of a portion of the tool 102 captured by the camera 106 is referred to as a "partial image".

Figure 8:
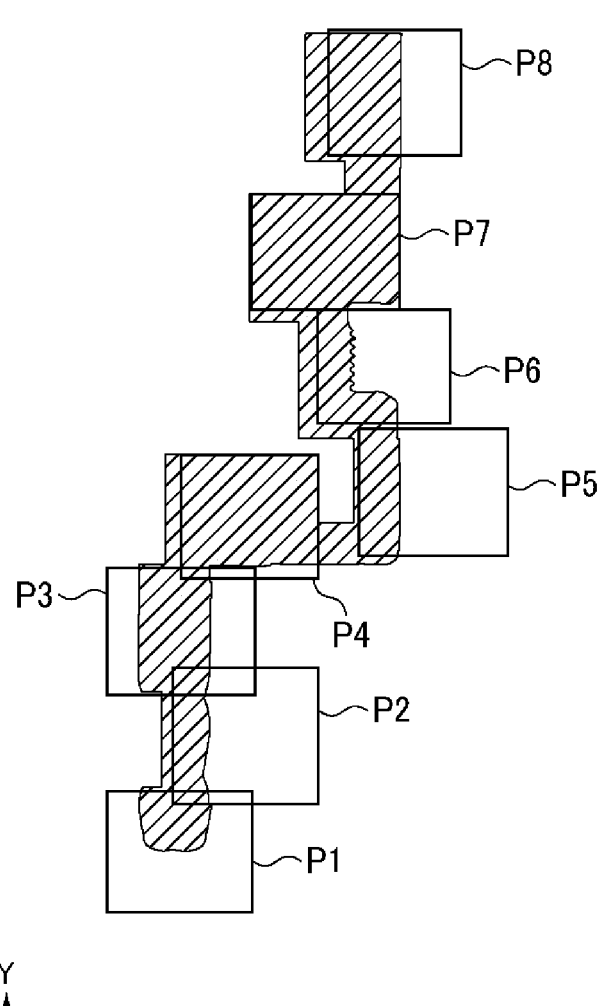
FIG. 8 is a schematic diagram illustrating a relation between a tool and partial images.
Figure 8:
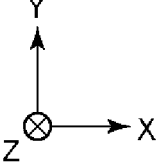

FIG. 8 is a schematic diagram illustrating a relation between a tool 102 and partial images.

At the time of tool registration, the machining control portion 122 moves the tool 102 (the spindle 116) in the Y-axis negative direction at a certain speed. The tool check unit 152 constantly monitors the imaging area 170. Live view images in the imaging area 170 are transferred from the camera 106 to the image processing device 110. The tool check unit 152 instructs the camera 106 to capture an image (a partial image) when the leading end of the blade portion 112 is detected in the imaging area 170 (the live view images). When receiving an instruction, the camera 106 captures a first partial image and sets the image in a memory. A partial image P1 is first captured in FIG. 8.

Next, the machining control portion 122 further moves the tool 102 (the spindle 116) in the Y-axis negative direction. At this time, the machining control portion 122 slightly moves the spindle 116 also in the X-axis negative direction to prevent the outline of the tool 102 from falling outside the imaging area 170. The tool check unit 152 provides an instruction indicating a movement direction and a movement amount of the tool 102 to the operation controller 120. After the movement, the tool check unit 152 instructs the camera 106 to capture a partial image and the camera 106 saves a second partial image P2 in the memory. In this way, the machining control portion 122 moves the spindle 116 little by little in the Y-axis negative direction while adequately moving the spindle 116 to right or left (in the X direction).

The tool check unit 152 instructs the camera 106 to image (to capture partial images) according to the movement of the spindle 116, and partial images P1 to P8 are captured. The tool check unit 152 generates the outline of the tool 102, that is, tool shape data (the registered shape and the tested shape) of the tool 102 on the basis of the partial images P1 to P8.

Figure 9:
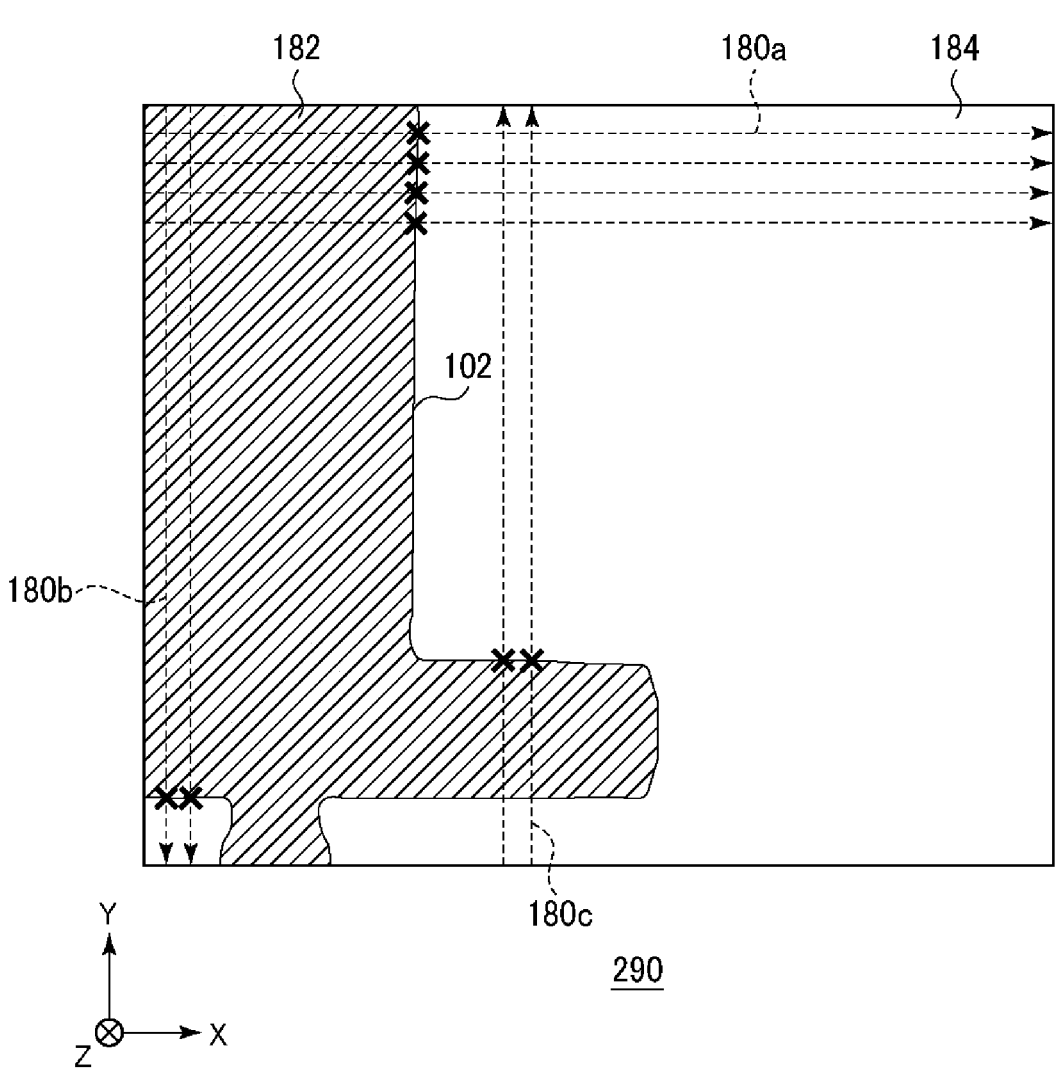
FIG. 9 is a diagram illustrating a partial image at a time when image recognition of a profile of the tool is to be performed.
Figure 10:
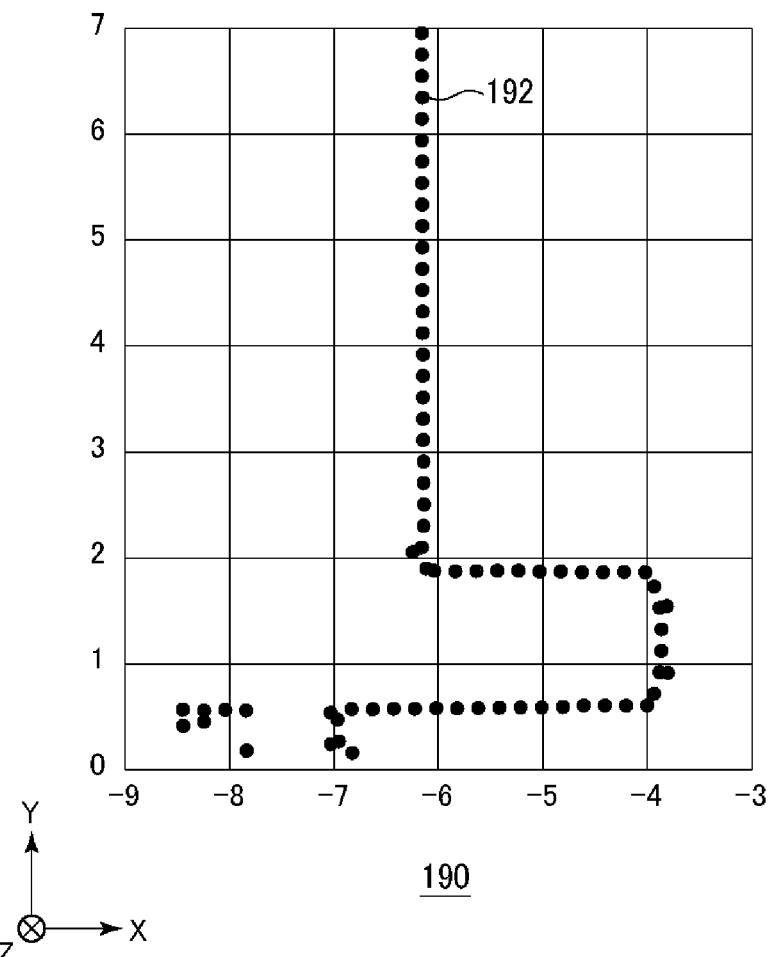
FIG. 10 is a diagram illustrating an edge point image.

FIG. 9 illustrates a partial image 290 at a time when image recognition of the profile of the tool 102 is to be performed. FIG. 10 is a diagram illustrating an edge point image 190.

A silhouette of the tool 102 illuminated from below by the illumination device 108 is shown in the partial image 290. The tool check unit 152 sets a scan line 180*a* in the X-axis positive direction and detects a point located on a border from a dark area 182 (a silhouette area where the tool 102 is present) to a bright area 184 (an area where the tool 102 is not present) as an edge point 192. The tool check unit 152 detects a plurality of edge points 192 while shifting the scan line 180*a* at a certain pitch.

The tool check unit 152 sets a scan line 180*b* in the Y-axis negative direction and detects an edge point 192 located on the border from the dark area 182 to the bright area 184 in the same manner. The tool check unit 152 detects a plurality of edge points 192 while shifting the scan line 180*b* at a certain pitch.

Further, the tool check unit 152 sets a scan line 180*c* in the Y-axis positive direction and detects an edge point 192 located on the border from the dark area 182 to the bright area 184. The tool check unit 152 detects a plurality of edge points 192 while shifting the scan line 180*c* at a certain pitch.

In this way, the edge points 192 are detected by setting the scan line 180*a*, the scan line 180*b*, and the scan line 180*c* in the three directions, and the edge point image 190 illustrated in FIG. 10 is obtained. Point sequence data indicating the outline of the tool 102 is obtained from the edge points 192 included in the edge point image 190. In the present embodiment, the processing time required for image recognition per partial image is about 200 to 250 milliseconds.

Figure 11:
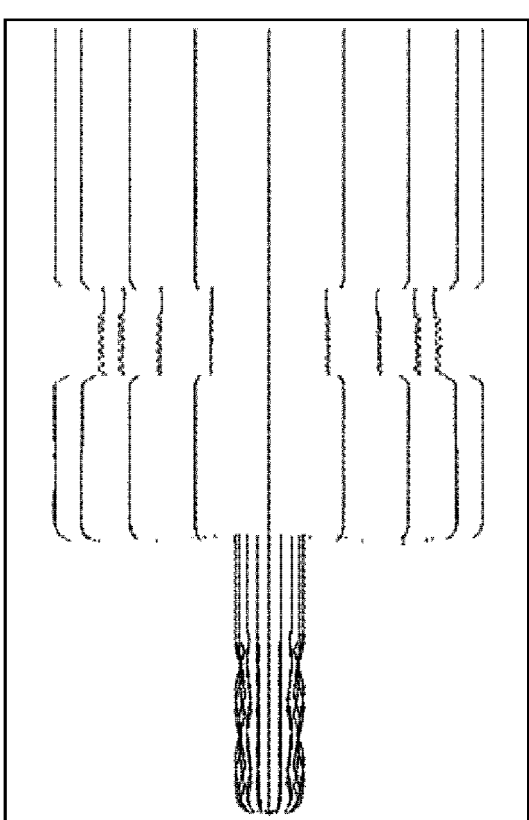
FIG. 11 is a diagram illustrating tool shape data of the tool.

FIG. 11 is a diagram illustrating the tool shape data of the tool 102.

Hereinafter, the rotation angle of the spindle 116 is referred to as a "spindle rotation angle". In the present embodiment, the tool 102 is imaged at a total of 30 angles (=360÷12) by rotating the tool 102 12 degrees by 12 degrees in the tool recognition area 210.

The machining control portion 122 sets the spindle rotation angle around the Y axis of the tool 102 and then moves the tool 102 also in the X-axis direction on the basis of the edge angle while moving the tool 102 in the Y-axis negative direction. The tool check unit 152 acquires the partial image 290 in the imaging area 170 and detects the edge points 192 from the partial image 290 to identify the profile of the tool 102. A plurality of partial images are acquired at one spindle rotation angle. Next, the tool check unit 152 rotates the tool 102 by 12 degrees and performs the same processes with respect to the next spindle rotation angle.

When ten partial images 290 are acquired for one spindle rotation angle, a total of 300 partial images 290 can be acquired by setting 30 spindle rotation angles. The point sequence data indicated by the edge point image 190 can be obtained from these partial images 290. The tool check unit 152 synthesizes the point sequence data of each of the partial images 290 to generate the tool shape data illustrated in FIG. 11, that is, point sequence data indicating a solid shape of the tool 102. Hereinafter, a process of generating the tool shape data illustrated in FIG. 11 from the partial images of the tool 102 is referred to as a "shape recognition process".

Figure 12:
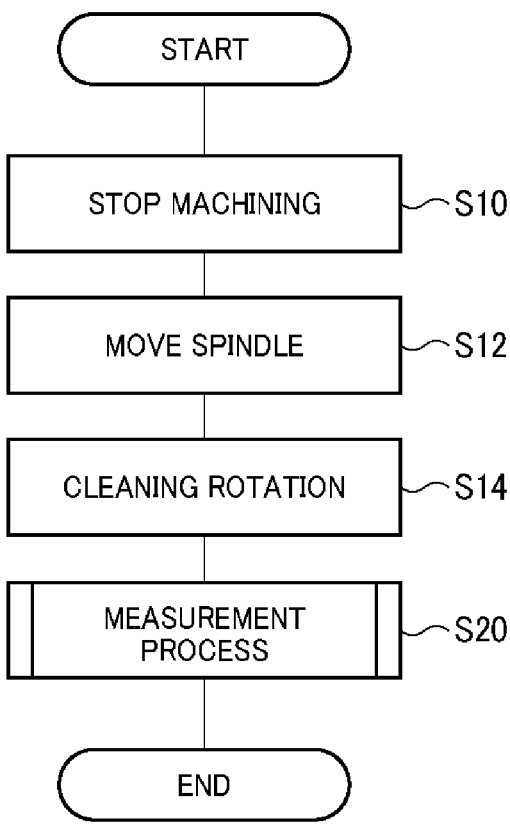
FIG. 12 is a flowchart illustrating processes performed when a tool test is performed after cleaning rotation.

FIG. 12 is a flowchart illustrating processes performed when a tool test is performed after cleaning rotation.

The processes illustrated in FIG. 12 are started when a predetermined measurement command MX is detected in the machining program. A tool test is performed also when interference occurs or when the operator inputs a measurement instruction through the console 206 or the image processing device 110.

When the measurement command MX is detected, the machining control portion 122 stops the spindle 116 to interrupt machining of a workpiece (S10). Next, the machining control portion 122 moves the spindle 116 to the standby position short of the tool recognition area 210 (S12). At this time, the cover control portion 320 closes the external cover 300. The spindle 116 is temporarily stopped at the standby position and the machining control portion 122 performs the cleaning rotation (S14). Adhering substances are removed from the tool 102 by the cleaning rotation. After the cleaning rotation ends, the machining control portion 122 informs the operation controller 120 of the end of the cleaning and a measurement process is started (S20). Details of the measurement process are described below with reference to the next figure, FIG. 13.

Figure 13:
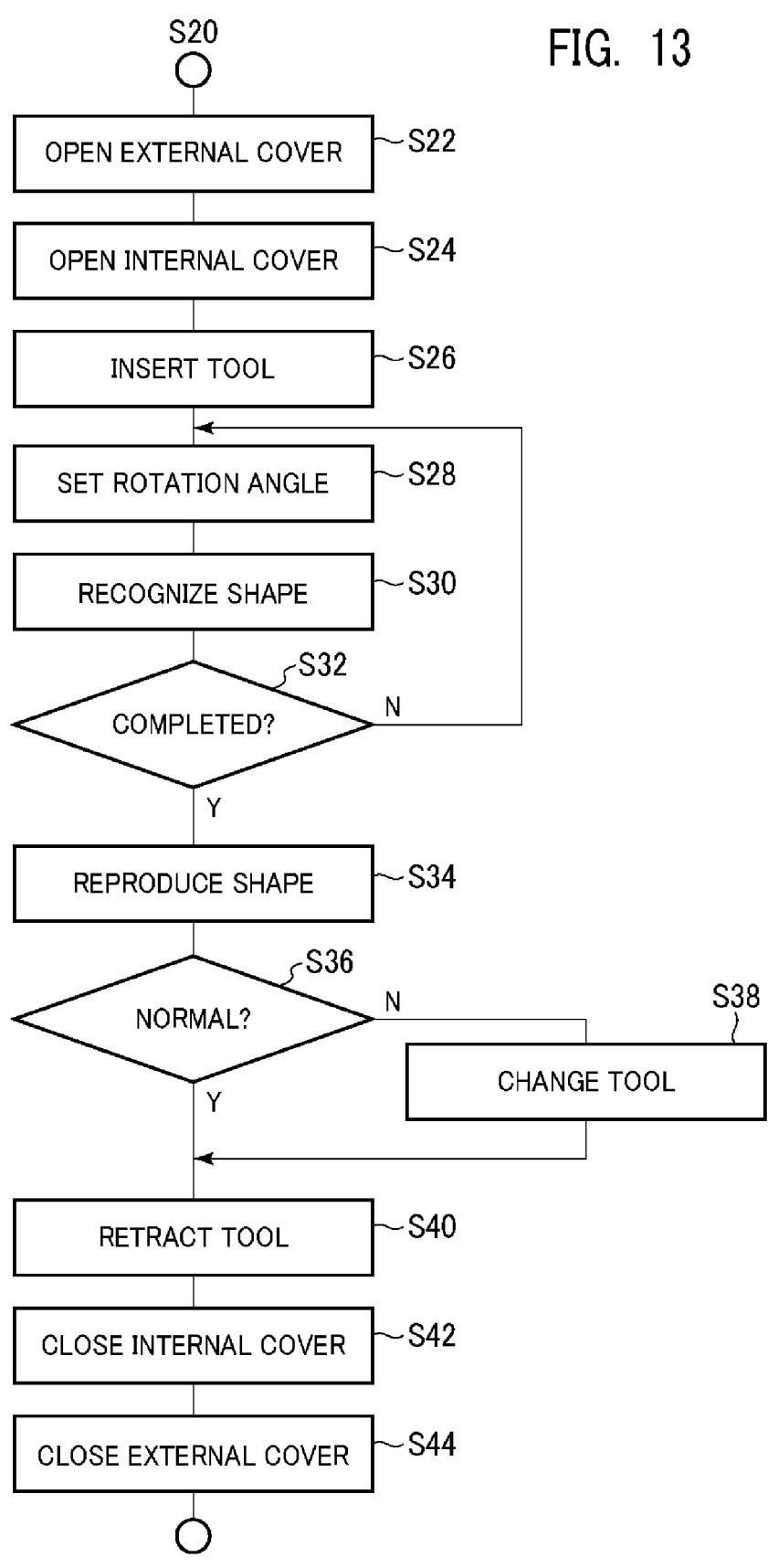
FIG. 13 is a flowchart illustrating processes of the measurement process in S20 in FIG. 12.

FIG. 13 is a flowchart illustrating processes of the measurement process in S20 in FIG. 12.

After the cleaning rotation ends, the cover control portion 320 opens the external cover 300 (S22). To prevent the adhering substances or mist flowing in the machining chamber from entering the tool recognition area 210, it is desirable that the cover control portion 320 opens the external cover 300 as late as possible. More preferably, the cover control portion 320 opens the external cover 300 just before the tool 102 is brought to contact with the external cover 300 of the tool recognition area 210. By opening the external cover 300, the spindle 116 (the tool 102) is enabled to enter the tool recognition area 210. Subsequently, the cover control portion 320 opens the internal cover (the first cover 304 and the second cover 306) (S24). By opening the internal cover, the tool 102 is enabled to be imaged in the tool recognition area 210.

When opening of the external cover and the internal cover is completed, the cover control portion 320 informs the machining control portion 122 of completion of the cover opening. The machining control portion 122 moves the spindle 116 to insert the tool 102 into the tool recognition area 210 (S26).

The machining control portion 122 sets the spindle rotation angle (S28). After setting the spindle rotation angle, the machining control portion 122 moves the spindle 116 in the X and Y directions and the tool check unit 152 performs shape recognition of the tool 102 by acquiring a plurality of partial images (S30). In the shape recognition process, the outline of the tool 102 is identified as point sequence data at the set spindle rotation angle. When there is an unset spindle rotation angle (N in S32), the process returns to S28 to set a next rotation angle (for example, 12 degrees). When the shape recognition process has been performed at a total of 30 spindle rotation angles (Y in S32), the tool check unit 152 generates tool shape data (the tested shape) indicating a solid shape of the tool 102 from the point sequence data obtained with respect to the spindle rotation angles (S34).

The image processing device 110 displays the tested shape and the registered shape on the screen, and the operator determines whether a tool change is required (S36). Whether the tool change is required may be determined not by visual determination of the operator but may be automatically determined by image recognition of the image processing device 110. In this case, the image processing device 110 includes a tool determining unit (not illustrated). Specifically, the tool determining unit determines that the tool 102 has a fracture, in other words, the tool 102 has become a faulty tool when the degree of similarity between the registered shape and the tested shape, particularly the degree of similarity in the outline is equal to or lower than a predetermined value. For example, the tool determining unit may determine that the tool 102 has a fracture when the ratio (B/A) between a blade length A detected from the registered shape and a blade length B detected from the tested shape is equal to or lower than a predetermined value.

When the tool 102 is a faulty tool (N in S36), the image processing device 110 instructs the tool changing portion 126 to change the tool via the machining control portion 122 (S38). When the tool 102 is normal (Y in S36), the tool 102 is continuously used without a tool change. The machining control portion 122 retracts the tool 102 from the tool recognition area 210 (S40). After the retraction is completed, the machining control portion 122 informs the operation controller 120 of completion of the retraction. The cover control portion 320 of the operation controller 120 first closes the internal cover (S42). Subsequently, the cover control portion 320 closes the external cover 300 (S44).

As another method, adhering substances may be removed from the tool 102 by cleaning injection. A case in which adhering substances are removed from the tool 102 by the cleaning injection is explained with reference to FIG. 14.

Figure 14:
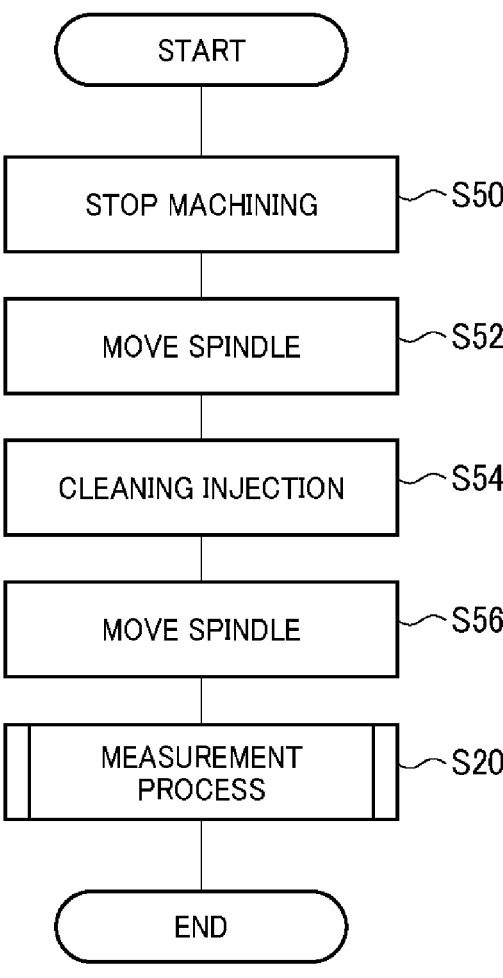
FIG. 14 is a flowchart illustrating processes performed when a tool test is performed after air injection.

FIG. 14 is a flowchart illustrating processes performed when a tool test is performed after air injection.

When the measurement command MX is detected, the machining control portion 122 stops the spindle 116 to interrupt machining of a workpiece (S50). Next, the machining control portion 122 moves the spindle 116 short of the air nozzle 302 (S52). The spindle 116 is temporarily stopped and the air nozzle 302 injects air to the tool 102 (S54). Adhering substances are blown away from the tool 102 by the injection of the air. After the cleaning injection, the machining control portion 122 moves the spindle 116 short of the tool recognition area 210 (S56). The machining control portion 122 informs the operation controller 120 of the end of cleaning and the measurement process is started (S20). Details of the measurement process are same as those explained with reference to FIG. 13.

In the case of the cleaning injection method, the spindle 116 needs to be moved twice (S52 and S56). Accordingly, the time of a tool test can be shortened in the cleaning rotation method than in the cleaning injection method. The cleaning injection may be combined when adhering substances on the tool 102 cannot be sufficiently removed by the cleaning rotation.

As described above, since the spindle 116 needs to be moved to the vicinity of the air nozzle 302 in the case of the cleaning injection method, the movement distance of the spindle 116 is adversely longer than in the cleaning rotation method. Furthermore, the cleaning rotation method enables the tool 102 to enter the tool recognition area 210 only by moving the spindle 116 substantially only in the Y-axis direction.

In the cleaning injection method, at least four steps of:
(1) moving the spindle 116 to the location of the air nozzle 302;
(2) injecting air by turning on the air nozzle 302;
(3) moving the spindle 116 short of the tool recognition area 210 ("Return"); and
(4) performing the measurement process (S20) are required to execute the measurement command MX. In contrast thereto, the processes (1) to (3) described above are unnecessary while the cleaning rotation (S14) is required in the cleaning rotation method. Furthermore, in the cleaning rotation method, the cleaning rotation (S14) may be automatically performed as a part of the measurement command MX.

<Summarization>

The machine tool 100 has been described above on the basis of the embodiment.

The tools 102 are gradually abraded away during machining. Furthermore, the tools 102 may have a fracture during machining due to interference with equipment. Therefore, the tool test needs to be performed as appropriate to prohibit use of inappropriate tools 102.

Adhering substances on the tools 102 need to be removed in advance to prevent the tool recognition area 210 from being soiled at the tool test. In the present embodiment, the adhering substances on the tools 102 can be removed by a simple method by performing the cleaning rotation before the tool test.

In the present embodiment, the machining control portion 122 is set in advance to automatically perform the cleaning rotation before the tool test when the measurement command MX is to be executed. Therefore, a dedicated command for instructing the cleaning rotation or a dedicated command for moving the spindle 116 to the standby position does not need to be described in the machining program. Accordingly, it is possible to prevent a soiled tool 102 from being inserted as it is in the tool recognition area 210 due to a programming error.

Since the amount of movement of the spindle 116 is smaller in the cleaning rotation method than in the cleaning injection method, the time required for the tool test can be shortened. Furthermore, the tool recognition area 210, the camera 106, and the illumination device 108 are protected by the external cover 300 and the internal cover (the first cover 304 and the second cover 306), so that the tool recognition area 210, particularly the camera 106 and the illumination device 108 can be effectively prevented from being soiled by adhering substances.

The present invention is not limited to the embodiment described above and modifications thereof, and any component thereof can be modified and embodied without departing from the scope of the invention. Components described in the embodiment and modifications can be combined as appropriate to form various embodiments. Some components may be omitted from the components presented in the embodiment and modification.

Modification

The present embodiment has been explained on the assumption that adhering substances on the tool 102 are removed by rotating the spindle 116 before a tool test. In a modification, adhering substances on the tool 102 may be removed by vibrating the spindle 116 before a tool test.

The present embodiment has been explained on the assumption that an image of the entire tool 102 is captured by positioning the tool 102 in a relatively small imaging area 170 and imaging the tool 102 several times. In a modification, the entire tool 102 may be imaged as a whole by a wide-angle camera 106 having a wider imaging area 170 at the tool test.

The cleaning rotation may be performed in accordance with an imaging program different from the machining program for controlling machining of a workpiece with the tools 102. Alternatively, the machining program may include both a cutting program (a cutting control algorithm) for instructing cutting of a workpiece and an imaging program (an imaging control algorithm). The cleaning rotation may be performed at execution of the part corresponding to the imaging program. An imaging process may be performed separately from the machining program. The term "imaging process" here is, for example, a process performed when an imaging button (not illustrated) displayed on an operation screen of the image processing device 110 or the console 206 is selected. The machining control portion 122 may perform the cleaning rotation at the time of the imaging process.

At the time of a tool test, the cleaning rotation method according to control methods (1) to (3) described below may be performed.

<Control Method (1)>

The machining control portion 122 machines a workpiece by rotating a tool 102. When the measurement command MX is detected, the machining control portion 122 moves the spindle 116 to the standby position in a state where the tool 102 is being rotated. After the spindle 116 is moved to the standby position, the machining control portion 122 temporarily stops the movement of the spindle 116 and the rotation of the tool 102. The machining control portion 122 performs the cleaning rotation at the standby position. After adhering substances are removed, the cover control portion 320 opens the external cover 300 and the internal cover and the machining control portion 122 inserts the spindle 116 into the tool recognition area 210.

In a case of moving the camera 106 instead of the spindle 116, the camera 106 is moved to a predetermined position, the movement of the camera 106 and the rotation of the tool 102 are stopped, the cleaning rotation is performed, and subsequently the machining control portion 122 moves the camera 106 and inserts the tool 102 into the tool recognition area 210.

<Control Method (2)>

The machining control portion 122 machines a workpiece by rotating a tool 102. When the measurement command MX is detected, the machining control portion 122 moves the spindle 116 to the standby position in a state where the tool 102 is being rotated. After the spindle 116 is moved to the standby position, the machining control portion 122 continues the rotation of the tool 102 while stopping the movement of the spindle 116. The machining control portion 122 increases the rotation speed of the tool 102 to perform the cleaning rotation. After adhering substances are removed, the cover control portion 320 opens the external cover 300 and the internal cover and the machining control portion 122 inserts the spindle 116 into the tool recognition area 210. The same holds for a case of moving the camera 106 instead of the spindle 116.

<Control Method (3)>

The machining control portion 122 machines a workpiece by rotating a tool 102. When the measurement command MX is detected, the machining control portion 122 moves the spindle 116 in a first direction (for example, the Y-axis positive direction) in a state where the tool 102 is being rotated. After the spindle 116 is moved by a predetermined distance, the machining control portion 122 changes the movement direction of the spindle 116 to a second direction (for example, the Z-axis negative direction) while continuing the rotation of the tool 102. The cleaning injection may be performed at this time. Subsequently, the cover control portion 320 opens the external cover 300 and the internal cover and the machining control portion 122 inserts the spindle 116 into the tool recognition area 210.

What is claimed is:

1. A machine tool comprising:

a camera fixed to be capable of imaging a predetermined imaging area and for imaging a tool located in the imaging area;

a tool holding portion to which a tool is attachable;

a machining controller controlling the tool holding portion in accordance with a machining program and machining a workpiece with the tool; and a cover controller closing a shutter located between the imaging area and a predetermined tool standby position during rotation of the tool, and opening the shutter after an end of the rotation of the tool, wherein the machining controller and the cover controller include a processor and a memory, wherein the machining controller moves the tool toward the imaging area to image the tool after rotating the tool, and the machining controller moves the tool holding portion toward the predetermined tool standby position different from an imaging position where a tool is positioned when the tool is to be imaged, rotates the tool at a speed equal to or higher than a predetermined rotation speed at the predetermined tool standby position, and subsequently moves the tool toward the imaging area to image the tool, wherein the machining controller moves the tool toward the imaging area after the shutter is opened.

2. The machine tool according to claim 1, further comprising a first cover for covering a lens of the camera, wherein the cover controller opens the first cover after the shutter is opened after an end of the rotation of the tool.

3. The machine tool according to claim 1, wherein at a time when the camera and the tool are relatively moved, a first partial image of the tool is captured when a leading end of the tool is detected in an imaging range, and a plurality of partial images of the tool are captured in association with relative movement of the tool.

4. The machine tool according to claim 1, wherein the machining controller moves the tool toward the imaging area when a predetermined measurement command is to be executed in the machining program, and

the machining controller moves the tool toward the imaging area after rotating the tool when the measurement command is to be executed, even if the machining program does not include a command explicitly instructing a rotational motion of the tool before imaging of the tool.

5. The machine tool according to claim 1, further comprising an image processing device including a processor detecting a plurality of edge points indicating a profile position of the tool from captured images of the tool and forming tool shape data indicating a profile of the tool on the basis of the edge points.

6. The machine tool according to claim 5,
wherein the machining controller rotates the tool when inserting the tool to the imaging area, and
the image processing device captures a plurality of images respectively corresponding to a plurality of rotation angles, detects an edge point from each of the captured images, and forms the tool shape data as three-dimensional point group data on the basis of the edge points detected correspondingly to the rotation angles, respectively.

7. A machine tool comprising:
a camera fixed to be capable of imaging a predetermined imaging area and for imaging a tool located in the imaging area;
a tool holding portion to which a tool is attachable; and
a machining controller controlling the tool holding portion in accordance with a machining program and machining a workpiece with the tool,
wherein the machining controller includes a processor and a memory,
wherein the machining controller moves the tool toward the imaging area to image the tool after rotating the tool, and wherein at a time when the camera and the tool are relatively moved, a first partial image of the tool is captured when a leading end of the tool is detected in an imaging range, and a plurality of partial images of the tool are captured in association with relative movement of the tool.

8. A machine tool comprising:
a camera fixed to be capable of imaging a predetermined imaging area and for imaging a tool located in the imaging area;
a tool holding portion to which a tool is attachable;
a machining controller controlling the tool holding portion in accordance with a machining program and machining a workpiece with the tool; and
an image processing device including a processor detecting a plurality of edge points indicating a profile position of the tool from captured images of the tool and forming tool shape data indicating a profile of the tool on the basis of the edge points,
wherein the machining controller include a processor and a memory,
wherein the machining controller moves the tool toward the imaging area to image the tool after rotating the tool, and
wherein the machining controller rotates the tool when inserting the tool to the imaging area, and
the image processing device captures a plurality of images respectively corresponding to a plurality of rotation angles, detects an edge point from each of the captured images, and forms the tool shape data as three-dimensional point group data on the basis of the edge points detected correspondingly to the rotation angles, respectively.

* * * * *